United States Patent
Bucknor et al.

(10) Patent No.: US 8,708,853 B2
(45) Date of Patent: *Apr. 29, 2014

(54) HYBRID TRANSMISSION WITH THREE PLANETARY GEAR SETS AND TWO INTERCONNECTING MEMBERS AND WITH SYNCHRONOUS SHIFT BETWEEN SERIES AND COMPOUND-SPLIT OPERATING MODES

(75) Inventors: Norman K. Bucknor, Troy, MI (US); Alan G. Holmes, Clarkston, MI (US)

(73) Assignee: GM Global Technology Operations LLC, Detroit, MI (US)

(*) Notice: Subject to any disclaimer, the term of this patent is extended or adjusted under 35 U.S.C. 154(b) by 302 days.

This patent is subject to a terminal disclaimer.

(21) Appl. No.: 13/086,501

(22) Filed: Apr. 14, 2011

(65) Prior Publication Data

US 2012/0264553 A1    Oct. 18, 2012

(51) Int. Cl.
*F16H 3/72* (2006.01)
*F16H 37/06* (2006.01)
*F16H 37/04* (2006.01)

(52) U.S. Cl.
USPC .................................. 475/5; 475/4

(58) Field of Classification Search
CPC ............. F16H 2037/047; F16H 2200/0021; F16H 2200/20; F16H 2200/2002; F16H 2200/201; F16H 2200/202; F16H 2200/203; F16H 2200/2035; F16H 2200/2097; B60K 6/365; B60K 6/54

USPC ........................................................ 475/1–10
See application file for complete search history.

(56) References Cited

U.S. PATENT DOCUMENTS

| | | | |
|---|---|---|---|
| 6,527,658 B2 | 3/2003 | Holmes et al. | |
| 7,128,675 B2 | 10/2006 | Klemen et al. | |
| 7,473,200 B2* | 1/2009 | Raghavan et al. | 475/5 |
| 2009/0082171 A1 | 3/2009 | Conlon et al. | |
| 2009/0176610 A1* | 7/2009 | Conlon | 475/5 |
| 2009/0281694 A1* | 11/2009 | Conlon et al. | 701/51 |

* cited by examiner

*Primary Examiner* — Tisha Lewis
(74) *Attorney, Agent, or Firm* — Quinn Law Group, PLLC (57) ABSTRACT

A hybrid transmission is provided that has both a hybrid series operating mode and a compound-split operating mode. The transmission includes an input member operatively connected with the engine, an output member, and a plurality of selectively engageable torque-transmitting mechanisms. A gearing arrangement and first and second motor/generators operatively connected with the gearing arrangement are also provided. The gearing arrangement includes a first, a second, and a third planetary gear set, each having a first, a second, and a third member. A first interconnecting member connects a respective one of the members of each of the planetary gear sets for common rotation with one another. A second interconnecting member connects another one of the members of one of the planetary gear sets for common rotation with another one of the members of another of the planetary gear sets.

18 Claims, 4 Drawing Sheets

HYBRID TRANSMISSION WITH THREE PLANETARY GEAR SETS AND TWO INTERCONNECTING MEMBERS AND WITH SYNCHRONOUS SHIFT BETWEEN SERIES AND COMPOUND-SPLIT OPERATING MODES

TECHNICAL FIELD

The invention relates to a hybrid transmission having both a series mode and a compound-split operating mode.

BACKGROUND OF THE INVENTION

Hybrid powertrains for vehicles utilize different power sources under different vehicle operating conditions. An electro-mechanical hybrid powertrain typically has an internal combustion engine, such as a diesel or gasoline engine, and one or more motor/generators. Different operating modes, such as an engine-only operating mode, an electric-only operating mode, and a hybrid operating mode are established by engaging brakes and/or clutches in different combinations and controlling the engine and motor/generators. The various operating modes are advantageous, as they may be used to improve fuel economy. However, the additional components required for a hybrid powertrain, such as the motor/generators, brakes and/or clutches, may increase overall vehicle cost and packaging space requirements.

SUMMARY OF THE INVENTION

A hybrid transmission is provided that has both a hybrid series operating mode and a compound-split operating mode. The transmission includes an input member operatively connected with the engine, an output member, and a plurality of selectively engageable torque-transmitting mechanisms. A gearing arrangement and first and second motor/generators operatively connected with the gearing arrangement are also provided. The gearing arrangement includes a first, a second, and a third planetary gear set, each having a first, a second, and a third member. A first interconnecting member connects a respective one of the members of each of the planetary gear sets for common rotation with one another. A second interconnecting member connects another of the members of one of the planetary gear sets for common rotation with another one of the members of another of the planetary gear sets. A first motor/generator is operatively connected with the first planetary gear set. A second motor/generator is operatively connected with the second planetary gear set. A first of the torque-transmitting mechanisms is engaged to establish a hybrid series operating mode between the input member and the output member. A second of the torque-transmitting mechanisms is engaged to establish a compound-split operating mode between the input member and the output member.

Due to the above-mentioned torque-transmitting mechanisms and interconnecting members, the shift between the hybrid series operating mode and the compound-split operating mode may be synchronous without slipping the torque-transmitting mechanisms and may occur while the engine is on. As used herein, "synchronous" means without substantial slip of any of the engaged torque-transmitting mechanisms, so that disengagement of one or more torque-transmitting mechanisms and engagement of one or more other torque-transmitting mechanisms can be commanded by the controller at essentially the same time. Feedback of the state of engagement or disengagement of the clutches during the shift is not essential, as in a controlled slip situation, thus simplifying the clutch control algorithm and clutch actuation system.

The compound-split operating mode may be used during high vehicle speeds to minimize the electrical losses associated with the series operation, especially with the motors at high speed. Because the compound-split mode utilizes the planetary gear sets, the motors may operate at a relatively low speed. By enabling a synchronous shift and avoiding slip, either mode can be easily selected and losses are minimized. The shift takes place at a transmission torque ratio corresponding to a fixed gear point, where it is possible for essentially all of the power from the input member to the output member to be transmitted mechanically if both clutches remain in the applied state and motor/generator power is removed, with no substantial power transmitted electrically.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
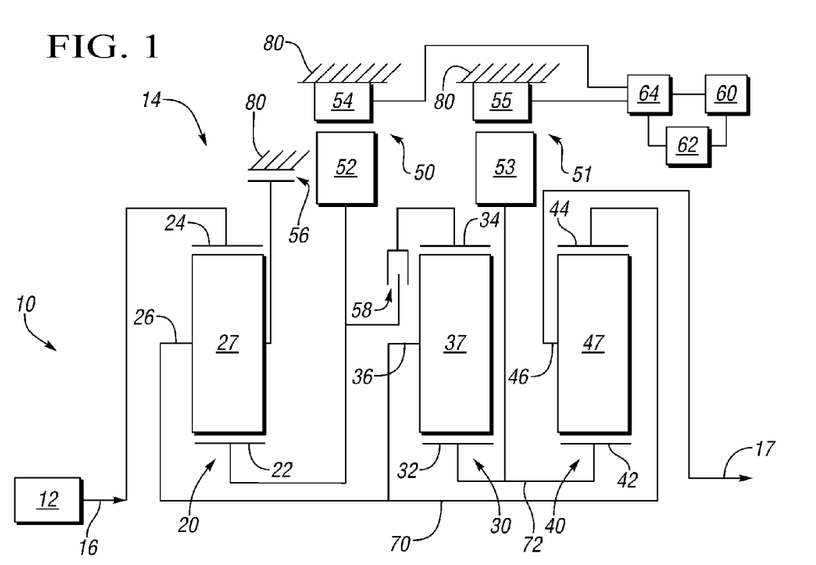
FIG. 1 is a schematic stick diagram illustration of a first embodiment of a hybrid powertrain.

Referring to the drawings, FIG. 1 shows a hybrid powertrain 10 that includes an engine 12 operatively connected to a hybrid transmission 14. An engine output member, such as a crankshaft, is operatively connected for rotation with an input member 16 of the transmission 14. As used herein, an "engine" includes any power source connected for providing torque at the input member 16 that is not powered by the electrical power stored in battery 60. For example, an engine includes an internal combustion engine, a diesel engine, a rotary engine, etc. The powertrain 10 is operable to provide tractive torque at an output member 17 of the transmission 14 in both a series hybrid operating mode and a compound-split hybrid operating mode, as discussed below.

The transmission 14 has three planetary gear sets 20, 30 and 40, each of which is a simple planetary gear set. Planetary gear set 20 has a sun gear member 22, a ring gear member 24 and a carrier member 26. Pinion gears 27 rotatably supported on carrier member 26 mesh with both the ring gear member 24 and the sun gear member 22. Planetary gear set 30 has a sun gear member 32, a ring gear member 34 and a carrier member 36. Pinion gears 37 rotatably supported on carrier member 36 mesh with both the ring gear member 34 and the sun gear member 32. Planetary gear set 40 has a sun gear member 42, a ring gear member 44 and a carrier member 46. Pinion gears 47 rotatably supported on carrier member 46 mesh with both the ring gear member 44 and the sun gear member 42. The input member 16 is continuously connected for common rotation with the ring gear member 24. The output member 17 is continuously connected for common rotation with the carrier member 46.

The transmission includes a first motor/generator 50 and a second motor/generator 51. Motor/generator 50 has a rotor 52 connected for common rotation with sun gear member 22 and a stator 54 grounded to a stationary member 80 such as a transmission casing. Second motor/generator 51 has a rotor 53 and a stator 55. Stator 55 is grounded to the stationary member 80. An energy storage device, such as a battery 60, is operatively connected by transfer conductors to the stators 54, 55. A controller 62 controls electrical transfer between the battery 60 and the stators 54, 55 through a power inverter module 64 that changes direct current provided by the battery 60 to alternating current required for operation of the motor/generators 50, 51 (and vice versa when the motor/generators 50, 51 are operable as generators). The inverter module 64 may house two separate inverters, one for each motor/generator 50, 51.

Carrier member 26, carrier member 36, and ring gear member 44 are continuously connected for common rotation with one another by a first interconnecting member 70. Sun gear member 32 is continuously connected for common rotation with sun gear member 42 by a second interconnecting member 72. A rotor hub of rotor 53 is also connected for common rotation with interconnecting member 72 so that sun gear members 32 and 42 rotate at the same speed as the rotor 53. As used herein, planetary gear set 20 is a first planetary gear set, planetary gear set 30 is a second planetary gear set, and planetary gear set 40 is a third planetary gear set. Ring gear member 24 is a first member, sun gear member 22 is a second member, and carrier member 26 is a third member of the planetary gear set 20. Carrier member 36 is a first member, sun gear member 32 is a second member, and ring gear member 34 is a third member of planetary gear set 30. Ring gear member 44 is a first member, sun gear member 42 is a second member, and carrier member 46 is a third member of planetary gear set 40.

The transmission 14 includes only two torque-transmitting mechanisms. A brake 56 is selectively engageable to ground the carrier member 26, carrier member 36, and ring gear member 44 to the stationary member 80 by grounding the interconnecting member 70. Clutch 58 is selectively engageable to connect the sun gear member 22 and rotor 52 of motor/generator 50 for common rotation with the ring gear member 34. By controlling the motor/generators 50, 51, the clutch 58 and the brake 56, multiple different operating modes are available for forward propulsion. The motor/generators 50, 51 may also capture braking energy in a regenerative braking mode and be controlled to start the engine 12 either from a cold start or from a stop/start (i.e., when temporarily shut off while the vehicle is being operated in another mode).

A series operating mode is established by engaging brake 56, not engaging clutch 58 (i.e., disengaging it if previously engaged), controlling motor/generator 50 to function as a generator, and controlling motor/generator 51 to function as a motor. With brake 56 engaged, carrier member 26, carrier member 36, and ring gear member 44 are stationary. Torque from the engine 12 is supplied to the rotor 52 at a gear ratio established by the planetary gear set 20. The torque is converted to electrical energy stored in the battery 60 or transmitted directly to the motor/generator 51 via inverter 64 to power motor/generator 51 to function as a motor, providing torque at the sun gear members 32 and 42. The torque is multiplied through the planetary gear set 40 and provided at the output member 17. Because ring gear member 34 is not connected to any other member or to the stationary member 80, planetary gear set 30 is inactive in the series operating mode.

A series operating mode requires two groups of gear members arranged so that the rotational speeds of the second group are determined by electrical power provided to a motor/generator connected to a member of the second group. The first group connects the engine 12 with the first motor/generator 50, and the second group connects the second motor/generator 51 with the output member 17. A series operating mode is beneficial because there is no purely mechanical power flow path between the engine 12 and the output member 17. Thus, spin losses and the disruption in output torque to restart the engine 12 using the motor/generators 50, 51 are lower. In the series operating mode, the first group of gear members includes those gear members providing a power flow path from the engine 12 to the motor/generator 50 (i.e., ring gear member 24, sun gear member 22, and interconnected carrier member 26, carrier member 36 and ring gear member 44). The second group of gear members includes those gear members providing a power flow path from the second motor/generator 51 to the output member 17 (i.e., interconnected sun gear members 32, 42, interconnected ring gear member 44, carrier member 26, and carrier member 36, and carrier member 46). Furthermore, in order to keep motor size relatively small, the motor/generator 51 that drives the output member 17 in the series mode should have a geared ratio to the output member 17. This requires a grounded member, in this case ring gear member 44.

A compound-split operating mode is provided when clutch 58 is engaged and brake 56 is not engaged (i.e., disengaging it if previously engaged). A compound-split operating mode is beneficial for efficient operation during high-speed driving, as it allows for reduced motor speeds and decreased power through the electrical power path. That is, all of the mechanical power is not converted to electrical power, then converted again to mechanical power through the motor/generators 50, 51 as is the case in the series operating mode.

A compound-split operating mode requires four planetary gear members that are not connected for common rotation with one another but that are connected with one another through differential gearing (i.e., one member (ring gear member 24) connected for rotation with the input member 16, a member (sun gear member 22) connected for rotation with the motor/generator 50, a member (interconnected sun gear members 32, 42) connected for rotation with the motor/generator 51, and a member (carrier member 46) connected for rotation with the output member 17). A fifth member (the ring gear member 34), is not connected with any other gear set member in the series operating mode, and thus helps to separate the four required members into a first group and a second group as is necessary in the series operating mode as described above. Clutch 58 can then be engaged to transition to the compound-split operating mode so that the sun gear member 22 and ring gear member 34 are interconnected to function as a single member, and interconnected carrier member 26, carrier member 36, and ring gear member 44 are available to be grounded during a shift to the series operating mode, while still allowing the other four members to be moving, as is required for the series operating mode, thus satisfying the requirement of the compound-split operating mode that there are four members interconnected by differential gearing.

In the compound-split operating mode, the engine 12 provides torque at the ring gear member 24 and the motor/generator 50 provides torque to or receives torque from the sun gear member 22 and ring gear member 34. The torque from the engine 12 and the motor/generator 50 is combined through the planetary gear set 20 to flow to the ring gear member 44. Torque is provided from or to the motor/generator 51 at the interconnected sun gear members 32, 42. Torque provided at ring gear member 44 and torque received from or provided to the motor/generator 51 at the sun gear member 42 is split through planetary gear set 40 to provide torque at the carrier member 46 and output member 17. Thus, the torque is split at planetary gear set 20 (input-split) and split again at planetary gear set 40 (output-split), making the operating mode a compound-split operating mode.

A switch from the series operating mode to the compound-split operating mode can occur with a synchronous shift of clutch 58 and brake 56 by controlling the motor/generator 50 to bring the speed of sun gear member 22 to the same speed as ring gear member 34. The gear members that are controlled to be at the same speed (ring gear member 34 and sun gear member 22) must be different than the four gear members required for series operation, as all of those gear members must be rotating in the series operating mode. Clutch 58 can then be engaged while brake 56 is released. There is no need to slip clutch 58 as there is no speed differential between the sun gear member 22 and the ring gear member 34. Thus, there are no mechanical losses due to slipping.

Furthermore, clutch 58 can be engaged at this synchronous speed while brake 56 remains engaged, establishing a fixed ratio operating mode. For example, if the ring gear member to sun gear member ratios of planetary gear set 20 is 1.5, the ring gear member to sun gear member ratio of planetary gear set 30 is 2.0, and the ring gear member to sun gear member ratio of planetary gear set 40 is 3.0 then if both clutch 58 and brake 56 are engaged, a fixed gear ratio of 1.33 will result between the input member 16 and the output member 17 when motor/generators 50 and 51 are not transmitting power.

An electric-only operating mode is established if the engine 12 is stopped, brake 56 is engaged, and motor/generator 51 is operated as a motor for forward propulsion.

When brake 56 is engaged, if the engine 12 is stopped, the motor/generator 50 can be controlled to operate as a motor to start the engine 12. Because clutch 58 is not engaged and planetary gear set 30 is inactive (does not carry torque), any engine-starting torque is not transferred through the transmission to the output member 17 while the engine 12 is being started.

During both the series operating mode and the compound-split operating mode, the motor/generator 51 can be controlled to operate as a generator to convert some of the torque at the output member 17 to electrical energy during vehicle braking.

Figure 2:
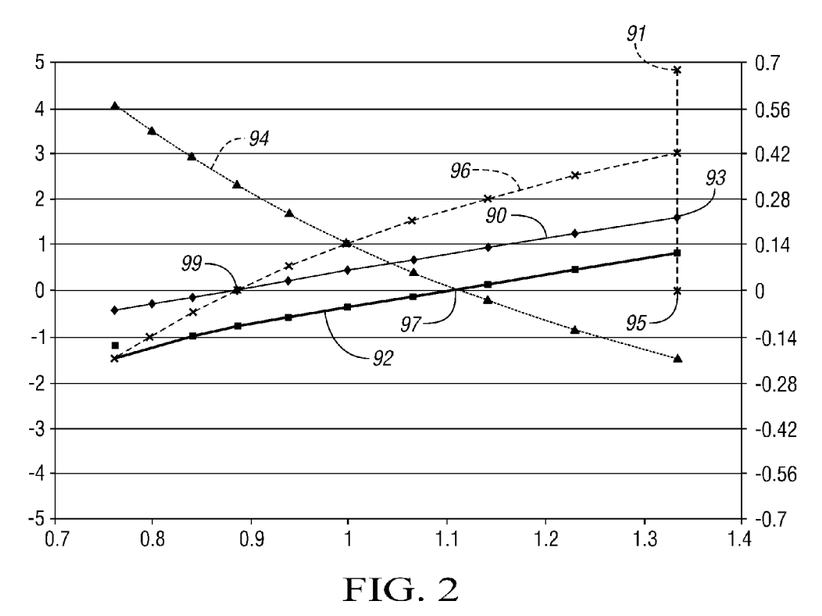
FIG. 2 is a chart showing the ratio of motor speed and torque to transmission input speed and torque respectively, versus transmission torque ratio for the powertrain of FIG. 1.

Referring to FIG. 2, the ratio of the speed of the motor/generator 50 or 51 to the speed of the transmission input member 16 is shown in the left vertical axis. The ratio of torque of the motor/generator 50 or 51 to the torque of the transmission input member 16 is shown on the right vertical axis. The ratio of the torque of the output member 17 to the torque of the input member 16 is shown in the horizontal axis. The compound-split operating mode is illustrated with the relationship between the ratio of the torque of motor/generator 50 to the torque of the input member 16 versus the ratio of torque of the output member 17 to torque of the input member 16 as curve 90. The relationship between the ratio of the torque of motor/generator 51 to the torque of the input member 16 versus the ratio of torque of the output member 17 to torque of the input member 16 is illustrated as curve 92. The relationship between the ratio of the speed of motor/generator 50 to the speed of the input member 16 versus the ratio of torque of the output member 17 to torque of the input member 16 is illustrated as curve 94. The relationship between the ratio of the speed of motor/generator 51 to the speed of the input member 16 versus the ratio of torque of the output member 17 to torque of the input member 16 is illustrated as curve 96.

FIG. 2 represents a compound-split operating mode of powertrain 10 assuming no battery power is used, and thus motor/generators 50 and 51 are power-balanced (i.e., the product of the speed and torque of motor/generator 50 is equal to the product of the speed and torque of motor/generator 50). At point 91, in series mode with brake 56 engaged, clutch 58 can be engaged. The transition from series mode to compound-split mode occurs at constant transmission torque ratio 1.33 (point 91 to 93), with motor/generator 50 gradually reversing torque and thereby unloading torque on brake 56 and loading torque on clutch 58. At the same time, this increases the fraction of mechanical power directly transferred from engine 12 to output 17 from zero (series mode) to some intermediate split between mechanical and electrical power. When brake 56 is completely unloaded, it is disengaged and the transmission can ratio up or down. In the maneuver represented by FIG. 2, the transmission 14 starts ratioing downward in torque ratio (i.e., to the left in FIG. 2) in compound-split mode after the constant-ratio transition from series operating mode to compound-split operating mode. Alternatively, the motor/generator 50 torque could be reduced to zero by moving down to point 95 in FIG. 2. At this point, the transmission 14 is in fixed gear mode with 100% mechanical power transfer and no electrical loss. Note that in compound-split mode, there are two other points 97 and 99 where there is also 100% mechanical power transfer because one of the motor/generators 50 or 51 is stationary. However, at these points the motor torque is non-zero at the stationary motor, which consumes electrical power from the battery 60.

Figure 3:
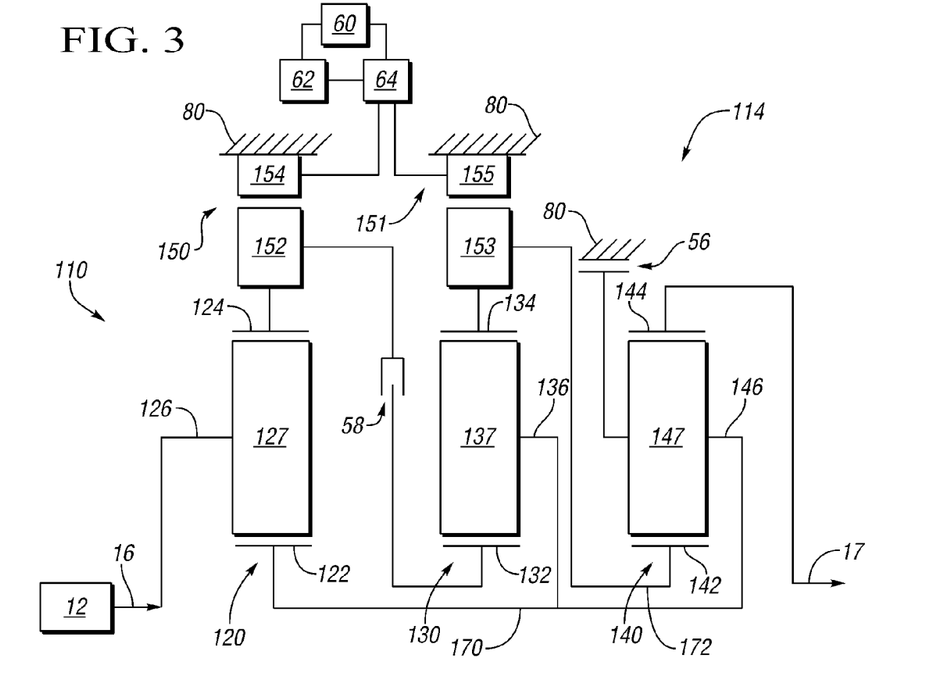
FIG. 3 is a schematic stick diagram illustration of a second embodiment of a hybrid powertrain.

FIG. 3 shows another embodiment of a hybrid powertrain 110 that includes a hybrid transmission 114 and that is operable to provide tractive torque at the output member 17 in both a series hybrid operating mode and a compound-split hybrid operating mode, as discussed below. Components that are identical or substantially similar to those in FIGS. 1 and 2 are referred to with identical reference numbers.

The transmission 114 has three planetary gear sets 120, 130 and 140, each of which is a simple planetary gear set. Planetary gear set 120 has a sun gear member 122, a ring gear member 124 and a carrier member 126. Pinion gears 127 rotatably supported on carrier member 126 mesh with sun gear member 122 and with the ring gear member 124. Planetary gear set 130 has a sun gear member 132, a ring gear member 134 and a carrier member 136. Pinion gears 137 rotatably supported on carrier member 136 mesh with both the ring gear member 134 and the sun gear member 132. Planetary gear set 140 has a sun gear member 142, a ring gear member 144 and a carrier member 146. Pinion gears 147 rotatably supported on carrier member 146 mesh with both the ring gear member 144 and the sun gear member 142. The input member 16 is continuously connected for common rotation with the carrier member 126. The output member 17 is continuously connected for common rotation with the ring gear member 144.

The transmission 114 includes a first motor/generator 150 and a second motor/generator 151. Motor/generator 150 has a rotor 152 connected for common rotation with ring gear member 124 and a stator 154 grounded to the stationary member 80. Second motor/generator 151 has a rotor 153 connected for common rotation with ring gear member 134 and sun gear member 142, and a stator 155 grounded to the stationary member 80. The battery 60 is operatively connected by transfer conductors to the stators 154, 155. The controller 62 controls electrical transfer between the battery 60 and the stators 154, 155 through the power inverter 64.

Sun gear member 122, carrier member 136, and carrier gear member 146 are continuously connected for common rotation with one another by a first interconnecting member 170. Ring gear member 134 is continuously connected for common rotation with sun gear member 142 and with rotor 153 by a second interconnecting member 172. As used herein, planetary gear set 120 is a first planetary gear set, planetary gear set 130 is a second planetary gear set, and planetary gear set 140 is a third planetary gear set. Carrier member 126 is a first member, ring gear member 124 is a second member, and sun gear member 122 is a third member of the planetary gear set 120. Carrier member 136 is a first member, ring gear member 134 is a second member, and sun gear member 132 is a third member of planetary gear set 130. Carrier member 146 is a first member, sun gear member 142 is a second member, and ring gear member 144 is a third member of planetary gear set 140.

The transmission 114 includes only the two torque-transmitting mechanisms 56 and 58. In this embodiment, brake 56 is selectively engageable to ground the carrier member 146, carrier member 136, and sun gear member 122 to the stationary member 80 by grounding interconnecting member 170. Clutch 58 is selectively engageable to connect ring gear member 124 for common rotation with sun gear member 132. By controlling the motor/generators 150, 151, the clutch 58 and the brake 56, multiple different operating modes are available for forward propulsion. The motor/generators 150, 151 may also capture braking energy in a regenerative braking mode and be controlled to start the engine 12 either from a cold start or from a stop/start (i.e., when temporarily shut off while the vehicle is being operated in another mode).

A series operating mode is established by engaging brake 56, not engaging clutch 58 (i.e., disengaging it if previously engaged), controlling motor/generator 150 to function as a generator, and controlling motor/generator 151 to function as a motor. With brake 56 engaged, sun gear member 122, carrier member 136, and carrier member 146 are stationary. Torque from the engine 12 is supplied to the rotor 152 at a gear ratio established by the planetary gear set 120. The torque is converted to electrical energy stored in the battery 60 or transmitted directly to motor/generator 151 via inverter 64 to power motor/generator 151 to function as a motor, providing torque at the sun gear member 142. The torque is multiplied through the planetary gear set 140 and provided at the output member 17. Because sun gear member 132 is not connected to any other member or to the stationary member 80, planetary gear set 130 is inactive in the series operating mode.

As discussed above, a series operating mode requires two groups of gear members that are connected with one another for power transfer only by the electrical connection between the two motor/generators. One group connects the engine 12 with the first motor/generator 150, and the other group connects the second motor/generator 151 with the output member 17. In the series operating mode, the first group of gear members provides a power flow path from the engine 12 to the motor/generator 150 (i.e., carrier member 126, grounded sun gear member 122, and ring gear member 124). The second group of gear members provides a power flow path from the motor/generator 151 to the output member 17 (i.e., sun gear member 142, grounded carrier member 146, and ring gear member 144). Furthermore, in order to keep motor size relatively small, the motor generator 151 that drives the output member 17 in the series mode should have a geared ratio to the output member 17. This requires a grounded member, in this case carrier member 146.

A compound-split operating mode is provided when clutch 58 is engaged and brake 56 is not engaged (i.e., disengaging it if previously engaged). A compound-split operating mode requires four planetary gear set members that are not connected for common rotation with one another but that are connected with one another through differential gearing (i.e., one member (carrier member 126) connected for rotation with the input member 16, a member (interconnected ring gear member 124 and sun gear member 132) connected for rotation with the motor/generator 150, a member (interconnected ring gear member 134 and sun gear member 142) connected for rotation with the motor/generator 151, and a member (ring gear member 144) connected for common rotation with the output member 17). A fifth member (the interconnected sun gear member 122, carrier member 136, and carrier member 146) is not connected with any other gear set member in the series operating mode, and thus helps to separate the four required members into a first group and a second group as is necessary in the series operating mode as described above. Clutch 58 can then be engaged to transition to the compound-split operating mode so that the ring gear member 124 and the sun gear member 132 are interconnected to function as a single member, thus satisfying the requirement of the compound-split operating mode that there are four members interconnected by differential gearing.

In the compound-split operating mode, the engine 12 provides torque at the carrier member 126 and the motor/generator 150 provides torque to or receives torque from the ring gear member 124. The torque from the engine 12 and the motor/generator 150 is combined through the planetary gear set 120 to flow to the interconnected sun gear member 122 and carrier member 146. Torque is provided from or to the motor/generator 251 at the interconnected ring gear member 134 and sun gear member 142. Torque from the engine 12 and motor/generator 150 provided at carrier member 146 and torque received from or provided to the motor/generator 151 at the sun gear member 142 is split through planetary gear set 140 to provide torque at the ring gear member 144 and output member 17. Thus, the torque is split at planetary gear set 120 (input-split) and split again at planetary gear set 140 (output-split), making the operating mode a compound-split operating mode.

A switch from the series operating mode to the compound-split operating mode can occur with a synchronous shift of clutch 58 and brake 56 by controlling the motor/generator 150 to bring the speed of ring gear member 124 to the same speed as sun gear member 132. Clutch 58 can then be engaged while brake 56 is released. There is no need to slip clutch 58 as there is no speed differential between the ring gear member 124 and the sun gear member 132. Thus, there are no mechanical losses due to slipping.

Furthermore, clutch 58 can be engaged at this synchronous speed while 56 remains engaged, establishing a fixed ratio operating mode. For example, if the ring gear member to sun gear member ratio of planetary gear set 120 is 1.5, of planetary gear set 130 is 1.6, and of planetary gear set 140 is 2.0, then if both clutch 58 and brake 56 are engaged, a fixed gear ratio of 1.92 will result between the input member 16 and the output member 17 when motor/generators 150 and 151 are not transmitting power.

An electric-only operating mode is established if the engine 12 is stopped, brake 56 is engaged, and motor/generator 151 is operated as a motor for forward propulsion.

When brake 56 is engaged, if the engine 12 is stopped, the motor/generator 150 can be controlled to operate as a motor to start the engine 12. Because clutch 58 is not engaged, planetary gear set 130 is inactive (does not carry torque). Also, motor/generator 151 may be off so that planetary gear set 140 is also inactive. The engine-starting torque disturbance is not transferred to the output member 17 while the engine 12 is being started.

During both the series operating mode and the compound-split operating mode, the motor/generator 151 can be controlled to operate as a generator to convert some of the torque at the output member 17 to electrical energy during vehicle braking.

Figure 4:
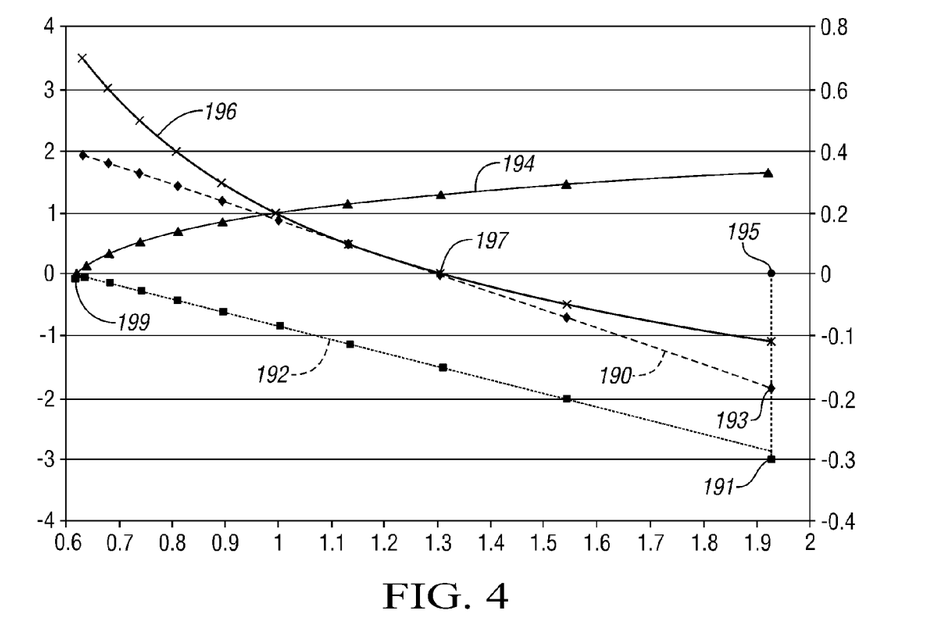
FIG. 4 is a chart showing the ratio of motor speed and torque to transmission input speed and torque respectively, versus transmission torque ratio for the powertrain of FIG. 3.

Referring to FIG. 4, the ratio of the speed of the motor/generator 150 or 151 to the speed of the transmission input member 16 is shown in the left vertical axis. The ratio of torque of the motor/generator 150 or 151 to the torque of the transmission input member 16 is shown on the right vertical axis. The ratio of the torque of the output member 17 to the torque of the input member 16 is shown in the horizontal axis. The compound-split operating mode is illustrated with the relationship between the ratio of the torque of motor/generator 150 to the torque of the input member 16 versus the ratio of torque of the input member 16 to torque of the output member 17 as curve 190. The relationship between the ratio of the torque of motor/generator 151 to the torque of the input member 16 versus the ratio of torque of the output member 17 to torque of the input member 16 is illustrated as curve 192. The relationship between the ratio of the speed of motor/generator 150 to the speed of the input member 16 versus the ratio of torque of the output member 17 to torque of the input member 16 is illustrated as curve 194. The relationship between the ratio of the speed of motor/generator 151 to the speed of the input member 16 versus the ratio of torque of the output member 17 to torque of the input member 16 is illustrated as curve 196.

FIG. 4 represents a compound-split operating mode of powertrain 110 assuming no battery power is used, and thus motor/generators 150 and 151 are power-balanced (i.e., the product of the speed and torque of motor/generator 150 is equal to the product of the speed and torque of motor/generator 151). At point 191, in series mode with brake 56 engaged, clutch 58 can be engaged. The transition from series mode to compound-split mode occurs at constant transmission torque ratio 1.92 (point 191 to point 193), with motor/generator 150 reducing torque and thereby unloading torque on brake 56 and loading torque on clutch 58. At the same time, this increases the fraction of mechanical power directly transferred from engine 12 to output 17 from zero (series mode) to some intermediate split between mechanical and electrical power. When brake 56 is completely unloaded, it is disengaged and the transmission 114 can ratio up or down. In the maneuver represented by FIG. 4, the transmission 114 starts ratioing downward in torque ratio (i.e., to the left in FIG. 4) in compound-split mode after the constant-ratio transition from series operating mode to compound-split operating mode. Alternatively, the motor/generator 150 torque could be reduced to zero by moving to point 195 in FIG. 4. At this point, the transmission 114 is in fixed gear mode with 100% mechanical power transfer and no electrical loss. Note that in compound-split mode, there are two other points 197 and 199 where there is also 100% mechanical power transfer because one of the motor/generators 150 or 151 is stationary. However, at these points the motor torque is non-zero at the stationary motor, which consumes electrical power from the battery 60.

Figure 5:
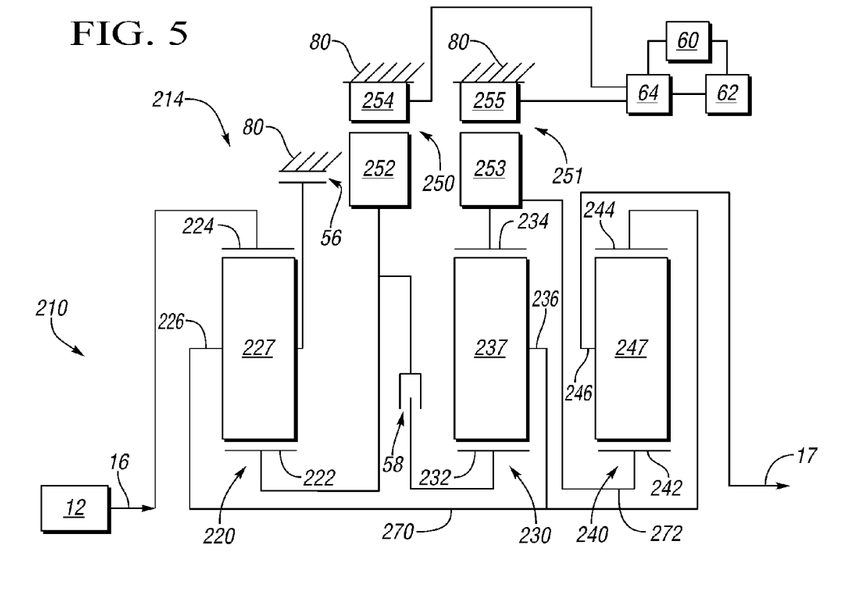
FIG. 5 is a schematic stick diagram illustration of a third embodiment of a hybrid powertrain.

FIG. 5 shows another embodiment of a hybrid powertrain 210 that includes a hybrid transmission 214 and that is operable to provide tractive torque at the output member 17 in both a series hybrid operating mode and a compound-split hybrid operating mode, as discussed below. Components that are identical or substantially similar to those in FIGS. 1 and 2 are referred to with identical reference numbers.

The transmission 214 has three planetary gear sets 220, 230 and 240, each of which is a simple planetary gear set. Planetary gear set 220 has a sun gear member 222, a ring gear member 224 and a carrier member 226. Pinion gears 227 rotatably supported on carrier member 226 mesh with both sun gear member 222 and ring gear member 224. Planetary gear set 230 has a sun gear member 232, a ring gear member 234 and a carrier member 236. Pinion gears 237 rotatably supported on carrier member 236 mesh with both the ring gear member 234 and the sun gear member 232. Planetary gear set 240 has a sun gear member 242, a ring gear member 244 and a carrier member 246. Pinion gears 247 rotatably supported on carrier member 246 mesh with both the ring gear member 244 and the sun gear member 242. The input member 16 is continuously connected for common rotation with the ring gear member 224. The output member 17 is continuously connected for common rotation with the carrier member 246.

The transmission 214 includes a first motor/generator 250 and a second motor/generator 251. Motor/generator 250 has a rotor 252 connected for common rotation with sun gear member 222 and a stator 254 grounded to the stationary member 80. Second motor/generator 251 has a rotor 253 connected for common rotation with ring gear member 234 and sun gear member 242, and a stator 255 grounded to the stationary member 80. The battery 60 is operatively connected by transfer conductors to the stators 254, 255. The controller 62 controls electrical transfer between the battery 60 and the stators 254, 255 through the power inverter 64.

Carrier member 226, carrier member 236, and ring gear member 244 are continuously connected for common rotation with one another by a first interconnecting member 270. Ring gear member 234 is continuously connected for common rotation with sun gear member 242 and with rotor 253 by a second interconnecting member 272. As used herein, planetary gear set 220 is a first planetary gear set, planetary gear set 230 is a second planetary gear set, and planetary gear set 240 is a third planetary gear set. Ring gear member 224 is a first member, sun gear member 222 is a second member, and carrier member 226 is a third member of the planetary gear set 220. Carrier member 236 is a first member, ring gear member 234 is a second member, and sun gear member 232 is a third member of planetary gear set 230. Ring gear member 244 is a first member, sun gear member 242 is a second member, and carrier member 246 is a third member of planetary gear set 240.

The transmission 214 includes only the two torque-transmitting mechanisms 56 and 58. In this embodiment, brake 56 is selectively engageable to ground the carrier member 226, carrier member 236, and ring gear member 244 to the stationary member 80 by grounding interconnecting member 270. Clutch 58 is selectively engageable to connect sun gear member 222 for common rotation with sun gear member 232 and motor/generator 250. By controlling the motor/generators 250, 251, the clutch 58 and the brake 56, multiple different operating modes are available for forward propulsion. The motor/generators 250, 251 may also capture braking energy in a regenerative braking mode and be controlled to start the engine 12 either from a cold start or from a stop/start (i.e., when temporarily shut off while the vehicle is being operated in another mode).

A series operating mode is established by engaging brake 56, not engaging clutch 58 (i.e., disengaging it if previously engaged), controlling motor/generator 250 to function as a generator, and controlling motor/generator 251 to function as a motor. With brake 56 engaged, carrier member 226, carrier member 236 and ring gear member 244 are stationary. Torque from the engine 12 is supplied to the rotor 252 at a gear ratio established by the planetary gear set 220. The torque is converted to electrical energy stored in the battery 60 or transmitted directly to motor/generator 251 via inverter 64 to power motor/generator 251 to function as a motor, providing torque at the sun gear member 242. The torque is multiplied through the planetary gear set 240 and provided at the output member 17. Because sun gear member 232 is not connected to any other member or to the stationary member 80, planetary gear set 230 is inactive in the series operating mode.

As discussed above, a series operating mode requires two groups of gear members that are connected with one another for power transfer only by the electrical connection between the two motor/generators. One group connects the engine 12 with the first motor/generator 250, and the other group connects the second motor/generator 251 with the output member 17. In the series operating mode, the first group of gear members provides a power flow path from the engine 12 to the motor/generator 250 (i.e., ring gear member 224, grounded carrier member 226, and sun gear member 222). The second group of gear members provides a power flow path from the motor/generator 251 to the output member 17 (i.e., sun gear member 242, grounded ring gear member 244, and carrier member 246). Furthermore, in order to keep motor size relatively small, the motor generator 251 that drives the output member 17 in the series mode should have a geared ratio to the output member 17. This requires a grounded member, in this case ring gear member 244.

A compound-split operating mode is provided when clutch 58 is engaged and brake 56 is not engaged (i.e., disengaging it if previously engaged). A compound-split operating mode requires four planetary gear set members that are not connected for common rotation with one another but that are connected with one another through differential gearing (i.e., one member (ring gear member 224) connected for rotation with the input member 16, a member (sun gear member 222) connected for rotation with the motor/generator 250, a member (interconnected ring gear member 234 and sun gear member 242) connected for rotation with the motor/generator 251, and a member (carrier member 246) connected for common rotation with the output member 17). A fifth member, the sun gear member 232, is not connected with any other gear set member in the series operating mode, and thus helps to separate the four required members into a first group and a second group as is necessary in the series operating mode as described above. Clutch 58 can then be engaged to transition to the compound-split operating mode so that the sun gear member 222 and sun gear member 232 are interconnected to function as a single member, thus satisfying the requirement of the compound-split operating mode that there are four members interconnected by differential gearing.

In the compound-split operating mode, the engine 12 provides torque at the ring gear member 224 and the motor/generator 250 provides torque to or receives torque from the sun gear member 222. The torque from the engine 12 and the motor/generator 250 is combined through the planetary gear set 220 to flow to the interconnected carrier member 226, carrier member 236, and ring gear member 244. Torque is provided from or to the motor/generator 251 at the interconnected ring gear member 234 and sun gear member 242. Torque from the engine 12 and motor/generator 250 provided at ring gear member 244 and torque received from or provided to the motor/generator 251 at the sun gear member 242 is split through planetary gear set 240 to provide torque at the carrier member 246 and output member 17. Thus, the torque is split at planetary gear set 220 (input-split) and split again at planetary gear set 240 (output-split), making the operating mode a compound-split operating mode.

A switch from the series operating mode to the compound-split operating mode can occur with a synchronous shift of clutch 58 and brake 56 by controlling the motor/generator 250 to bring the speed of sun gear member 222 to the same speed as sun gear member 232. Clutch 58 can then be engaged while brake 56 is released. There is no need to slip clutch 58 as there is no speed differential between the sun gear member 222 and the sun gear member 232. Thus, there are no mechanical losses due to slipping.

Furthermore, clutch 58 can be engaged at this synchronous speed while brake 56 remains engaged, establishing a fixed ratio operating mode. For example, if the ring gear member to sun gear member ratio of planetary gear set 220 is 3.0, of planetary gear set 230 is 2.0, and of planetary gear set 240 is 1.5, then if both clutch 58 and brake 56 are engaged, a fixed gear ratio of 1.67 will result between the input member 16 and the output member 17 when motor/generators 250 and 251 are not transmitting power.

An electric-only operating mode is established if the engine 12 is stopped, brake 56 is engaged, and motor/generator 251 is operated as a motor for forward propulsion.

When brake 56 is engaged, if the engine 12 is stopped, the motor/generator 250 can be controlled to operate as a motor to start the engine 12. Because clutch 58 is not engaged, planetary gear set 230 is inactive (does not carry torque). Also, motor/generator 251 may be off so that planetary gear set 240 is also inactive. The engine-starting torque disturbance is not transferred to the output member 17 while the engine 12 is being started.

During both the series operating mode and the compound-split operating mode, the motor/generator 251 can be controlled to operate as a generator to convert some of the torque at the output member 17 to electrical energy during vehicle braking.

Figure 6:
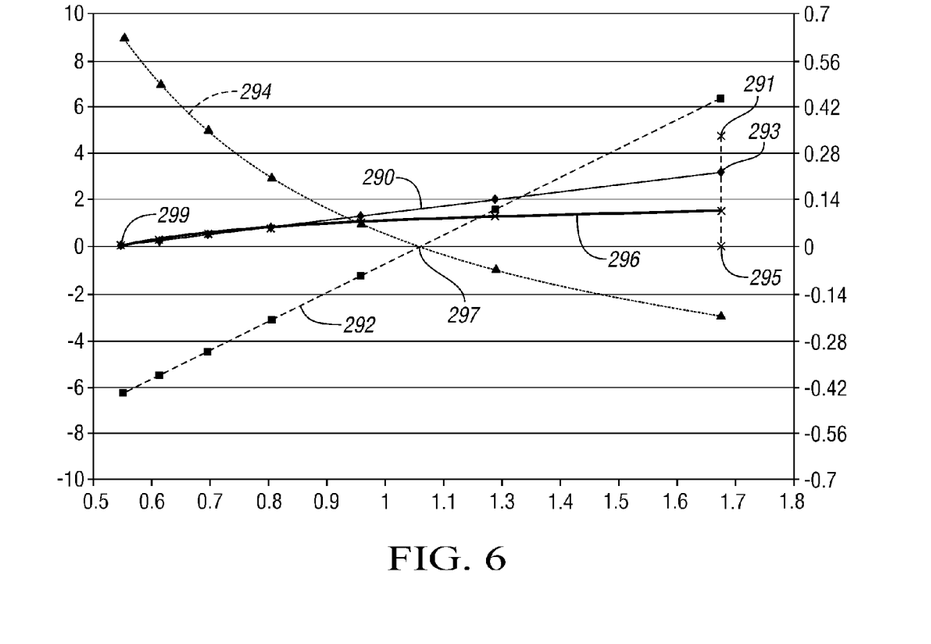
FIG. 6 is a chart showing the ratio of motor speed and torque to transmission input speed and torque respectively, versus transmission torque ratio for the powertrain of FIG. 5.

Referring to FIG. 6, the ratio of the speed of the motor/generator 250 or 251 to the speed of the transmission input member 16 is shown in the left vertical axis. The ratio of torque of the motor/generator 250 or 251 to the torque of the transmission input member 16 is shown on the right vertical axis. The ratio of the torque of the output member 17 to the torque of the input member 16 is shown in the horizontal axis. The compound-split operating mode is illustrated with the relationship between the ratio of the torque of motor/generator 250 to the torque of the input member 16 versus the ratio of torque of the input member 16 to torque of the output member 17 as curve 290. The relationship between the ratio of the torque of motor/generator 251 to the torque of the input member 16 versus the ratio of torque of the output member 17 to torque of the input member 16 is illustrated as curve 292. The relationship between the ratio of the speed of motor/generator 250 to the speed of the input member 16 versus the ratio of torque of the output member 17 to torque of the input member 16 is illustrated as curve 294. The relationship between the ratio of the speed of motor/generator 251 to the speed of the input member 16 versus the ratio of torque of the output member 17 to torque of the input member 16 is illustrated as curve 296.

FIG. 6 represents a compound-split operating mode of powertrain 210 assuming no battery power is used, and thus motor/generators 250 and 251 are power-balanced (i.e., the product of the speed and torque of motor/generator 250 is equal to the product of the speed and torque of motor/generator 251). At point 291, in series mode with brake 56 engaged, clutch 58 can be engaged. The transition from series mode to compound-split mode occurs at constant transmission torque ratio 1.67 (point 291 to point 293), with motor/generator 250 reducing torque and thereby unloading torque on brake 56 and loading torque on clutch 58. At the same time, this increases the fraction of mechanical power directly transferred from engine 12 to output 17 from zero (series mode) to some intermediate split between mechanical and electrical power. When brake 56 is completely unloaded, it is disengaged and the transmission 214 can ratio up or down. In the maneuver represented by FIG. 6, the transmission 214 starts ratioing downward in torque ratio (i.e., to the left in FIG. 6) in compound-split mode after the constant-ratio transition from series operating mode to compound-split operating mode. Alternatively, the motor/generator 250 torque could be reduced to zero by moving to point 295 in FIG. 6. At this point, the transmission 214 is in fixed gear mode with 100% mechanical power transfer and no electrical loss. Note that in compound-split mode, there are two other points 297 and 299 where there is also 100% mechanical power transfer because one of the motor/generators 250 or 251 is stationary. However, at these points the motor torque is non-zero at the stationary motor, which consumes electrical power from the battery 60.

Figure 7:
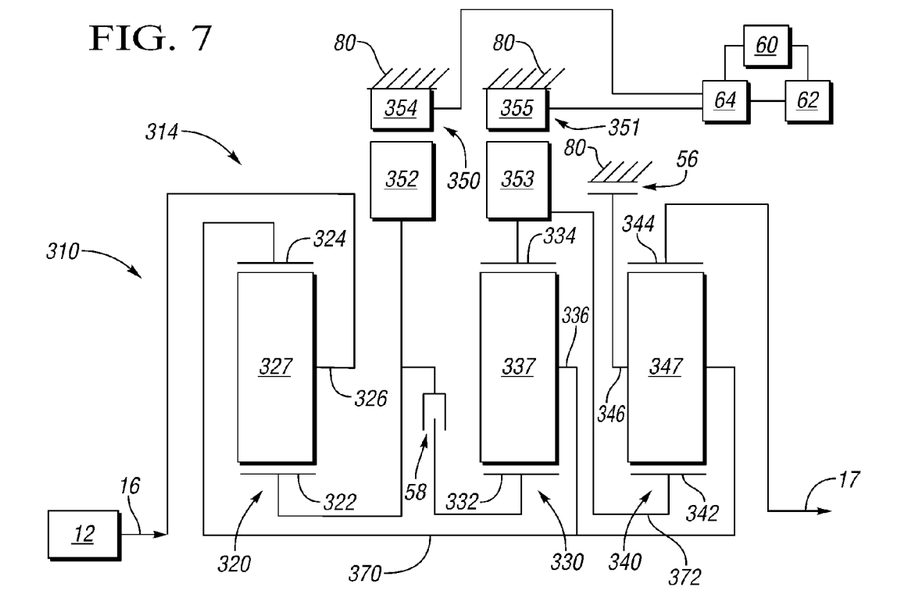
FIG. 7 is a schematic stick diagram illustration of a fourth embodiment of a hybrid powertrain.

FIG. 7 shows another embodiment of a hybrid powertrain 310 that includes a hybrid transmission 314 and is operable to provide tractive torque at the output member 17 in both a series hybrid operating mode and a compound-split hybrid operating mode, as discussed below. Components that are identical or substantially similar to those in FIGS. 1 and 2 are referred to with identical reference numbers.

The transmission 314 has three planetary gear sets 320, 330 and 340, each of which is a simple planetary gear set. Planetary gear set 320 has a sun gear member 322, a ring gear member 324 and a carrier member 326. Pinion gears 327 rotatably supported on carrier member 326 mesh with both the ring gear member 324 and the sun gear member 322. Planetary gear set 330 has a sun gear member 332, a ring gear member 334 and a carrier member 336. Pinion gears 337 rotatably supported on carrier member 336 mesh with both the ring gear member 334 and the sun gear member 332. Planetary gear set 340 has a sun gear member 342, a ring gear member 344 and a carrier member 346. Pinion gears 347 rotatably supported on carrier member 346 mesh with both the ring gear member 344 and the sun gear member 342. The input member 16 is continuously connected for common rotation with the carrier member 326. The output member 17 is continuously connected for common rotation with the ring gear member 344.

The transmission 314 includes a first motor/generator 350 and a second motor/generator 351. Motor/generator 350 has a rotor 352 connected for common rotation with sun gear member 322 and a stator 354 grounded to the stationary member 80. Second motor/generator 351 has a rotor 353 and a stator 355. Stator 355 is grounded to the stationary member 80. The battery 60 is operatively connected by transfer conductors to the stators 354, 355. The controller 62 controls electrical transfer between the battery 60 and the stators 354, 355 through the power inverter 64.

Ring gear member 324, carrier member 336 and carrier member 346 are continuously connected for common rotation with one another by a first interconnecting member 370. Ring gear member 334 is continuously connected for common rotation with sun gear member 342 and with rotor 353 by a second interconnecting member 372. As used herein, planetary gear set 320 is a first planetary gear set, planetary gear set 330 is a second planetary gear set, and planetary gear set 340 is a third planetary gear set. Carrier member 326 is a first member, sun gear member 322 is a second member, and ring gear member 324 is a third member of the planetary gear set 320. Carrier member 336 is a first member, ring member 334 is a second member, and sun gear member 332 is a third member of planetary gear set 330. Carrier member 346 is a first member, sun gear member 342 is a second member, and ring gear member 344 is a third member of planetary gear set 340.

The transmission 314 includes only the two torque-transmitting mechanisms 56 and 58. In this embodiment, brake 56 is selectively engageable to ground the ring gear member 324, carrier member 336 and carrier member 346 to the stationary member 80 by grounding interconnecting member 370. Clutch 58 is selectively engageable to connect the sun gear member 322 and the rotor 352 for common rotation with the sun gear member 332. By controlling the motor/generators 350, 351, the clutch 58 and the brake 56, multiple different operating modes are available for forward propulsion. The motor/generators 350, 351 may also capture braking energy in a regenerative braking mode and be controlled to start the engine 12 either from a cold start or from a stop/start (i.e., when temporarily shut off while the vehicle is being operated in another mode).

A series operating mode is established by engaging brake 56, not engaging clutch 58 (i.e., disengaging it if previously engaged), controlling motor/generator 350 to function as a generator, and controlling motor/generator 351 to function as a motor. With brake 56 engaged, ring gear member 324, carrier member 336, and carrier member 346 are stationary. Torque from the engine 12 is supplied to the rotor 352 at a gear ratio established by the planetary gear set 320. The torque is converted to electrical energy stored in the battery 60 or transmitted directly to motor/generator 351 via inverter 64 to power motor/generator 351 to function as a motor, providing torque at the sun gear member 342. The torque is multiplied through the planetary gear set 340 and provided at the output member 17. Because sun gear member 332 is not connected to any other member or to the stationary member 80, planetary gear set 330 is inactive in the series operating mode.

As discussed above, a series operating mode requires two groups of gear members that are connected with one another for power transfer only by the electrical connection between the two motor/generators. One group establishes a power flow path from the engine 12 to the first motor/generator 350, and the other group establishes a power flow path from the second motor/generator 351 to the output member 17. In the series operating mode, the gear members of the first group include carrier member 326, ring gear member 324 and sun gear member 322. The gear members of the second group include sun gear member 342, carrier member 346, and ring gear member 344. Furthermore, in order to keep motor size relatively small, the motor generator 351 that drives the output member 17 in the series mode should have a geared ratio to the output member 17. This requires a grounded member, in this case carrier member 346.

A compound-split operating mode is provided when clutch 58 is engaged and brake 56 is not engaged (i.e., disengaging it if previously engaged). A compound-split operating mode requires four planetary gear set members that are not connected for common rotation with one another but that are connected with one another through differential gearing (i.e., one member (carrier member 326) connected for rotation with the input member 16, a member (sun gear member 322) connected for rotation with the motor/generator 350, a member (sun gear member 342) connected for rotation with the motor/generator 351, and a member (ring gear member 344) connected for rotation with the output member 17). A fifth member, the sun gear member 332, is not connected with any other gear set member in the series operating mode, and thus helps to separate the four required members into a first group and a second group as is necessary in the series operating mode as described above. Clutch 58 can then be engaged to transition to the compound-split operating mode so that the sun gear member 322 and sun gear member 332 are interconnected to function as a single fifth member, while still allowing the other four members to be moving, as is required for the series operating mode, thus satisfying the requirement of the compound-split operating mode that there are four members interconnected by differential gearing.

In the compound-split operating mode, the engine 12 provides torque at the carrier member 326 and the motor/generator 350 provides torque to or receives torque from the sun gear member 322 and sun gear member 332. The torque from the engine 12 and the motor/generator 350 is combined through the planetary gear set 320 to flow to the interconnected ring gear member 324, carrier member 336 and carrier member 346. Torque is provided from or to the motor/generator 351 at ring gear member 334 and sun gear member 342. Torque provided at carrier member 346 and torque received from or provided to the motor/generator 351 at the sun gear member 342 is split through planetary gear set 340 to provide torque at the ring gear member 334 and output member 17. Thus, the torque is split at planetary gear set 320 (input-split) and split again at planetary gear set 340 (output-split), making the operating mode a compound-split operating mode.

A switch from the series operating mode to the compound-split operating mode can occur with a synchronous shift of clutch 58 and brake 56 by controlling the motor/generator 350 to bring the speed of sun gear member 322 to the same speed as sun gear member 332. Clutch 58 can then be engaged while brake 56 is released. There is no need to slip clutch 58 as there is no speed differential between the sun gear members 322, 332. Thus, there are no mechanical losses due to slipping.

Furthermore, clutch 58 can be engaged at this synchronous speed while brake 56 remains engaged, establishing a fixed ratio operating mode. For example, if the ring gear member to sun gear member ratio of planetary gear set 320 is 2.0, of planetary gear set 330 is 3.0, and of planetary gear set 340 is 1.5, then if both clutch 58 and brake 56 are engaged, a fixed gear ratio of 1.5 will result between the input member 16 and the output member 17 when motor/generators 350 and 351 are not transmitting power.

An electric-only operating mode is established if the engine 12 is stopped, brake 56 is engaged, and motor/generator 351 is operated as a motor for forward propulsion.

When brake 56 is engaged, if the engine 12 is stopped, the motor/generator 350 can be controlled to operate as a motor to start the engine 12. Because clutch 58 is not engaged, planetary gear set 330 is inactive (does not carry torque) and engine-starting torque disturbance is not transferred through the driveline to the output member 17 while the engine 12 is being started.

During both the series operating mode and the compound-split operating mode, the motor/generator 351 can be controlled to operate as a generator to convert some of the torque at the output member 17 to electrical energy during vehicle braking. During compound-split operating mode, motor/generator 350 may also act as a generator to convert mechanical power to electrical power.

Figure 8:
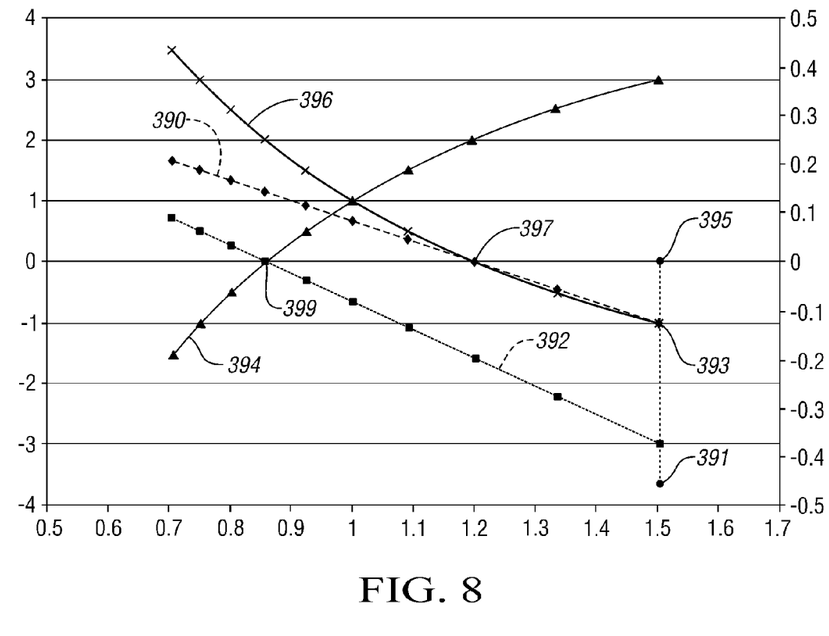
FIG. 8 is a chart showing the ratio of motor speed and torque to transmission input speed and torque respectively, versus transmission torque ratio for the powertrain of FIG. 7.

Referring to FIG. 8, the ratio of the speed of the motor/generator 350 or 351 to the speed of the transmission input member 16 is shown in the left vertical axis. The ratio of torque of the motor/generator 350 or 351 to the torque of the transmission input member 16 is shown on the right vertical axis. The ratio of the torque of the output member 17 to the torque of the input member 16 is shown in the horizontal axis. The compound-split operating mode is illustrated with the relationship between the ratio of the torque of motor/generator 350 to the torque of the input member 16 versus the ratio of torque of the output member 17 to torque of the input member 16 as curve 390. The relationship between the ratio of the torque of motor/generator 351 to the torque of the input member 16 versus the ratio of torque of the output member 17 to torque of the input member 16 is illustrated as curve 392. The relationship between the ratio of the speed of motor/generator 350 to the speed of the input member 16 versus the ratio of torque of the output member 17 to torque of the input member 16 is illustrated as curve 394. The relationship between the ratio of the speed of motor/generator 351 to the speed of the input member 16 versus the ratio of torque of the output member 17 to torque of the input member 16 is illustrated as curve 396.

FIG. 8 represents a compound-split operating mode of powertrain 310 assuming no battery power is used, and thus motor/generators 350 and 351 are power-balanced (i.e., the product of the speed and torque of motor/generator 350 is equal to the product of the speed and torque of motor/generator 351). At point 391, in series mode with brake 56 engaged, clutch 58 can be engaged. The transition from series mode to compound-split mode occurs at constant transmission torque ratio 1.5 (point 391 to point 393), with motor/generator 351 reducing torque and thereby unloading torque on brake 56 and loading torque on clutch 58. At the same time, this increases the fraction of mechanical power directly transferred from engine 12 to output 17 from zero (series mode) to some intermediate split between mechanical and electrical power. When brake 56 is completely unloaded, it is disengaged and the transmission 314 can ratio up or down. In the maneuver represented by FIG. 8, the transmission 314 starts ratioing downward (i.e., to the left in FIG. 8) in compound-split mode after the constant-ratio transition from series operating mode to compound-split operating mode. Alternatively, the motor/generator 351 torque could be held at zero moving only from point 391 to point 395 in FIG. 8. At this point, the transmission 314 is in fixed gear mode with 100% mechanical power transfer and no electrical loss. Note that in compound-split mode, there are two other points 397 and 399 where there is also 100% mechanical power transfer because one of the motor/generators 350 or 351 is stationary. However, at these points the motor torque is non-zero at the stationary motor, which consumes electrical power from the battery 60.

Although the planetary gear sets 20, 30, 40; 120, 130, 140; 220, 230, 240; and 320, 330, 340 are illustrated and described as simple planetary gear sets, compound planetary gear sets and double pinion planetary gear sets may also be used within the scope of the claimed invention.

While the best modes for carrying out the invention have been described in detail, those familiar with the art to which this invention relates will recognize various alternative designs and embodiments for practicing the invention within the scope of the appended claims.

The invention claimed is:

1. A hybrid transmission operatively connected with an engine, comprising:
   an input member operatively connected with the engine;
   an output member;
   only a first and a second selectively engageable torque-transmitting mechanism;
   a gearing arrangement including a first, a second, and a third planetary gear set, each of said planetary gear sets having a first member, a second member, and a third member;
   a first interconnecting member connecting a respective one of said members of each of said planetary gear sets for common rotation;
   a second interconnecting member connecting another one of said members of the second planetary gear set for common rotation with another one of said members of the third planetary gear set;
   a first motor/generator operatively connected with the first planetary gear set;
   a second motor/generator operatively connected with the second planetary gear set;
   wherein only the first torque-transmitting mechanism is engaged to establish a hybrid series operating mode between the input member and the output member;
   wherein only the second torque-transmitting mechanism is engaged to establish a compound-split operating mode between the input member and the output member;
   wherein the input member is connected for common rotation with a first member of the first planetary gear set; wherein the first motor/generator is connected for common rotation with a second member of the first planetary gear set; wherein the third member of the first planetary gear set is selectively grounded to the stationary member by engagement of the first torque-transmitting mechanism and is continuously connected for common rotation with the first member of the second planetary gear set and the first member of the third planetary gear set by the first interconnecting member;
   wherein the second motor/generator is continuously connected for common rotation with the second member of the second planetary gear set and with the second member of the third planetary gear set by the second interconnecting member; wherein the output member is continuously connected for common rotation with the third member of the third planetary gear set; and wherein the second torque-transmitting mechanism is selectively engageable to connect the second member of the first planetary gear set for common rotation with the third member of the second planetary gear set.

2. The hybrid transmission of claim 1, wherein a shift between the hybrid series operating mode and the compound-split operating mode is synchronous without slipping either of the first and the second torque-transmitting mechanisms.

3. The hybrid transmission of claim 1, wherein powerflow from a first group of the members of the planetary gear sets to a second group of the members of the planetary gear sets is via an electrical path through the motor/generators in the series operating mode; and wherein powerflow from the first group of the members of the planetary gear sets to the second group of the members of the planetary gear sets is via a mechanical path established by engaging the second torque-transmitting mechanism in the compound-split operating mode.

4. The hybrid transmission of claim 1, wherein the first member of the first planetary gear set is a ring gear member, the second member of the first planetary gear set is a sun gear member, and the third member of the first planetary gear set is a carrier member; wherein the first member of the second planetary gear set is a carrier member, the second member of the second planetary gear set is a sun gear member, and the third member of the second planetary gear set is a ring gear member; and wherein the first member of the third planetary gear set is a ring gear member, the second member of the third planetary gear set is a sun gear member, and the third member of the third planetary gear set is a carrier member.

5. The hybrid transmission of claim 1, wherein the first member of the first planetary gear set is a carrier member, the second member of the first planetary gear set is a ring gear member, and the third member of the first planetary gear set is a sun gear member; wherein the first member of the second planetary gear set is a carrier member, the second member of the second planetary gear set is a ring gear member, and the third member of the second planetary gear set is a sun gear member; and wherein the first member of the third planetary gear set is a carrier member, the second member of the third planetary gear set is a sun gear member, and the third member of the third planetary gear set is a ring gear member.

6. The hybrid transmission of claim 1, wherein the first member of the first planetary gear set is a ring gear member, the second member of the first planetary gear set is a sun gear member, and the third member of the first planetary gear set is a carrier member; wherein the first member of the second planetary gear set is a carrier member, the second member of the second planetary gear set is a ring gear member, and the third member of the second planetary gear set is a sun gear member; and wherein the first member of the third planetary gear set is a ring gear member, the second member of the third planetary gear set is a sun gear member, and the third member of the third planetary gear set is a carrier member.

7. The hybrid transmission of claim 1, wherein the first member of the first planetary gear set is a carrier member, the second member of the first planetary gear set is a sun gear member, and the third member of the first planetary gear set is a ring gear member; wherein the first member of the second planetary gear set is a carrier member, the second member of the second planetary gear set is a ring gear member, and the third member of the second planetary gear set is a sun gear member; and wherein the first member of the third planetary gear set is a carrier member, the second member of the third planetary gear set is a sun gear member, and the third member of the third planetary gear set is a ring gear member.

8. The hybrid transmission of claim 1, wherein one of the motor/generators is operable to start the engine when the first torque-transmitting mechanism is engaged and the second torque-transmitting mechanism is not engaged.

9. A hybrid transmission operatively connected with an engine, comprising:
   an input member operatively connected with the engine;
   an output member;
   a first and a second selectively engageable torque-transmitting mechanism;
   a first, a second, and a third planetary gear set, each of the planetary gear sets having a first, a second, and a third member; wherein the input member is connected for common rotation with the first member of the first planetary gear set; wherein the output member is connected for common rotation with the third member of the third planetary gear set;
   a first motor/generator operatively connected with the second member of the first planetary gear set;
   a second motor/generator operatively connected with the second member of the third planetary gear set;

a first interconnecting member continuously connecting the third member of the first planetary gear set for common rotation with the first member of the second planetary gear set and with the first member of the third planetary gear set;

a second interconnecting member continuously connecting the second member of the second planetary gear set for common rotation with the second member of the third planetary gear set;

a first torque-transmitting mechanism selectively engageable to ground the first interconnecting member to a stationary member to establish a hybrid series operating mode between the input member and the output member;

a second torque-transmitting mechanism selectively engageable to connect the second member of the first planetary gear set for common rotation with the third member of the second planetary gear set to establish a compound-split operating mode between the input member and the output member; and wherein a shift between the hybrid series operating mode and the compound-split operating mode is synchronous without slipping the torque-transmitting mechanisms.

10. The hybrid transmission of claim 9, wherein the first member of the first planetary gear set is a ring gear member, the second member of the first planetary gear set is a sun gear member, and the third member of the first planetary gear set is a carrier member; wherein the first member of the second planetary gear set is a carrier member, the second member of the second planetary gear set is a sun gear member, and the third member of the second planetary gear set is a ring gear member; and wherein the first member of the third planetary gear set is a ring gear member, the second member of the third planetary gear set is a sun gear member, and the third member of the third planetary gear set is a carrier member.

11. The hybrid transmission of claim 9, wherein the first member of the first planetary gear set is a carrier member, the second member of the first planetary gear set is a ring gear member, and the third member of the first planetary gear set is a sun gear member; wherein the first member of the second planetary gear set is a carrier member, the second member of the second planetary gear set is a ring gear member, and the third member of the second planetary gear set is a sun gear member; and wherein the first member of the third planetary gear set is a carrier member, the second member of the third planetary gear set is a sun gear member, and the third member of the third planetary gear set is a ring gear member.

12. The hybrid transmission of claim 9, wherein the first member of the first planetary gear set is a ring gear member, the second member of the first planetary gear set is a sun gear member, and the third member of the first planetary gear set is a carrier member; wherein the first member of the second planetary gear set is a carrier member, the second member of the second planetary gear set is a ring gear member, and the third member of the second planetary gear set is a sun gear member; and wherein the first member of the third planetary gear set is a ring gear member, the second member of the third planetary gear set is a sun gear member, and the third member of the third planetary gear set is a carrier member.

13. The hybrid transmission of claim 9, wherein the first member of the first planetary gear set is a carrier member, the second member of the first planetary gear set is a sun gear member, and the third member of the first planetary gear set is a ring gear member; wherein the first member of the second planetary gear set is a carrier member, the second member of the second planetary gear set is a ring gear member, and the third member of the second planetary gear set is a sun gear member; and wherein the first member of the third planetary gear set is a carrier member, the second member of the third planetary gear set is a sun gear member, and the third member of the third planetary gear set is a ring gear member.

14. The hybrid transmission of claim 9, wherein powerflow from a first group of the members of the planetary gear sets to a second group of the members of the planetary gear sets is via an electrical path through the motor/generators in the series operating mode; and wherein powerflow from the first group of the members of the planetary gear sets to the second group of the members of the planetary gear sets is via a mechanical path established by engaging the second torque-transmitting mechanism in the compound-split operating mode.

15. The hybrid transmission of claim 9, wherein one of the motor/generators is operable to start the engine when the first torque-transmitting mechanism is engaged and the second torque-transmitting mechanism is not engaged.

16. The hybrid transmission of claim 9, wherein the first, the second, and the third planetary gear sets are the only planetary gear sets; and wherein each of the first, the second, and the third planetary gear set is a simple planetary gear set.

17. A hybrid transmission operatively connected with an engine, comprising:
an input member operatively connected with the engine;
an output member;
only a first and a second selectively engageable torque-transmitting mechanism;
a first, a second, and a third planetary gear set, each of the planetary gear sets having a first, a second, and a third member; wherein the input member is connected for common rotation with the first member of the first planetary gear set; wherein the output member is connected for common rotation with the third member of the third planetary gear set;
a first motor/generator operatively connected with the second member of the first planetary gear set;
a second motor/generator operatively connected with the second member of the third planetary gear set;
a first interconnecting member continuously connecting the third member of the first planetary gear set for common rotation with the first member of the second planetary gear set and with the first member of the third planetary gear set;
a second interconnecting member continuously connecting the second member of the second planetary gear set for common rotation with the second member of the third planetary gear set;
a first torque-transmitting mechanism selectively engageable to ground the first interconnecting member to a stationary member to establish a hybrid series operating mode between the input member and the output member;
a second torque-transmitting mechanism selectively engageable to connect the second member of the first planetary gear set for common rotation with the third member of the second planetary gear set to establish a compound-split operating mode between the input member and the output member;
wherein a shift between the hybrid series operating mode and the compound-split operating mode is synchronous without slipping the torque-transmitting mechanisms;
wherein the first member of the first planetary gear set is a carrier member, the second member of the first planetary gear set is a sun gear member, and the third member of the first planetary gear set is a ring gear member; wherein the first member of the second planetary gear set is a carrier member, the second member of the second planetary gear set is a ring gear member, and the third member of the second planetary gear set is a sun gear member; wherein the first member of the third planetary gear set is a carrier member, the second member of the third planetary gear set is a sun gear member, and the third member of the third planetary gear set is a ring gear member; and wherein one of the motor/generators is operable to start the engine when the first torque-transmitting mechanism is engaged and the second torque-transmitting mechanism is not engaged.

18. The hybrid transmission of claim 17, wherein the first, the second, and the third planetary gear sets are the only planetary gear sets; and wherein each of the first, the second, and the third planetary gear set is a simple planetary gear set.

* * * * *